(12) United States Patent
Cheng et al.

(10) Patent No.: US 8,737,830 B2
(45) Date of Patent: May 27, 2014

(54) INTERCHANGEABLE ZOOM LENS ACTUATOR WITH AUTO-FOCUS ADJUSTMENT

(71) Applicant: Hong Kong Applied Science and Technology Research Institute Co. Ltd., Shatin (HK)

(72) Inventors: Kwok Sing Cheng, New Territories (HK); Chuen Kuen Yeung, New Territories (HK); Kin Ming Fan, Kowloon (HK)

(73) Assignee: Hong Kong Applied Science and Technology Research Institute Co. Ltd., Shatin, New Territories (HK)

( * ) Notice: Subject to any disclaimer, the term of this patent is extended or adjusted under 35 U.S.C. 154(b) by 0 days.

(21) Appl. No.: 13/802,472

(22) Filed: Mar. 13, 2013

(65) Prior Publication Data

US 2013/0194466 A1    Aug. 1, 2013

Related U.S. Application Data

(63) Continuation-in-part of application No. 13/190,258, filed on Jul. 25, 2011, now Pat. No. 8,428,451.

(51) Int. Cl.
*G03B 17/00*    (2006.01)

(52) U.S. Cl.
USPC ........................................................... 396/75

(58) Field of Classification Search
USPC ...................................................... 396/73, 75
See application file for complete search history.

(56) References Cited

U.S. PATENT DOCUMENTS

| | | | |
|---|---|---|---|
| 6,567,352 B1 * | 5/2003 | Inui et al. | 369/44.21 |
| 7,633,693 B2 * | 12/2009 | Hung et al. | 359/826 |
| 7,746,580 B2 | 6/2010 | Chang | |
| 7,747,155 B1 * | 6/2010 | Gutierrez | 396/73 |
| 8,077,254 B2 * | 12/2011 | Yu | 348/360 |
| 8,275,249 B2 * | 9/2012 | Imura et al. | 396/55 |
| 2003/0185551 A1 * | 10/2003 | Chen | 396/73 |
| 2005/0068444 A1 * | 3/2005 | Oshima et al. | 348/335 |
| 2011/0134542 A1 | 6/2011 | Lee | |

\* cited by examiner

*Primary Examiner* — Clayton E LaBalle
*Assistant Examiner* — Noam Reisner
(74) *Attorney, Agent, or Firm* — Berkeley Law & Technology Group, LLP

(57) ABSTRACT

The subject matter disclosed herein relates to an optical module that includes interchangeable lenses to adjust a zoom level or focus of the optical module.

25 Claims, 14 Drawing Sheets

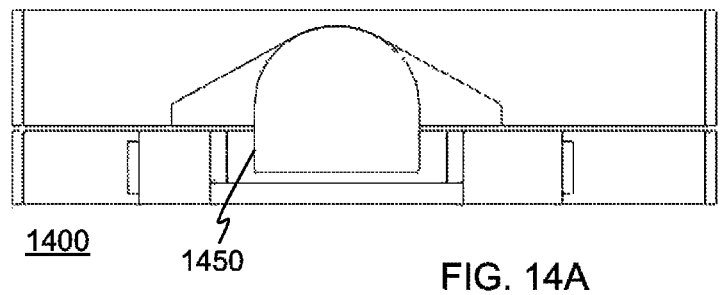
1400  1450    FIG. 14A
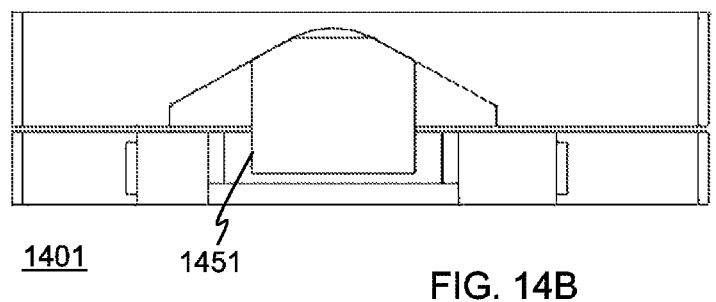
1401  1451    FIG. 14B
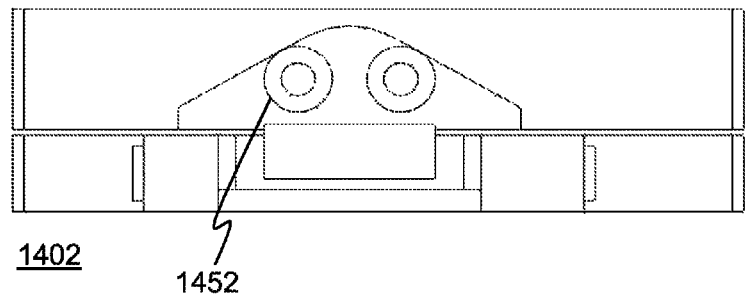
1402  1452    FIG. 14C

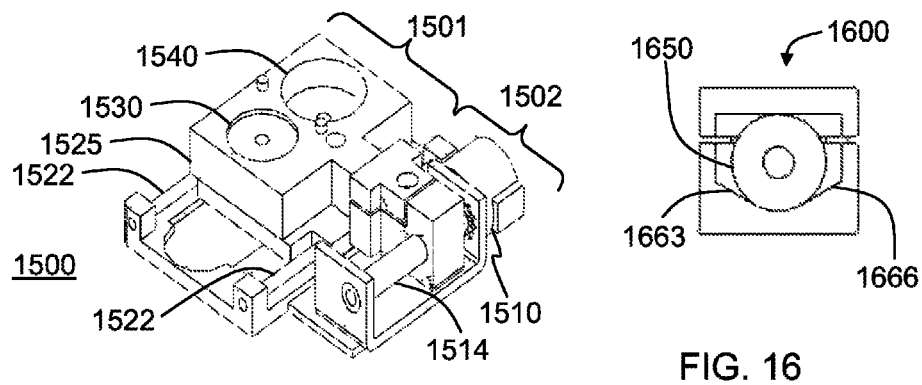
FIG. 15
FIG. 16
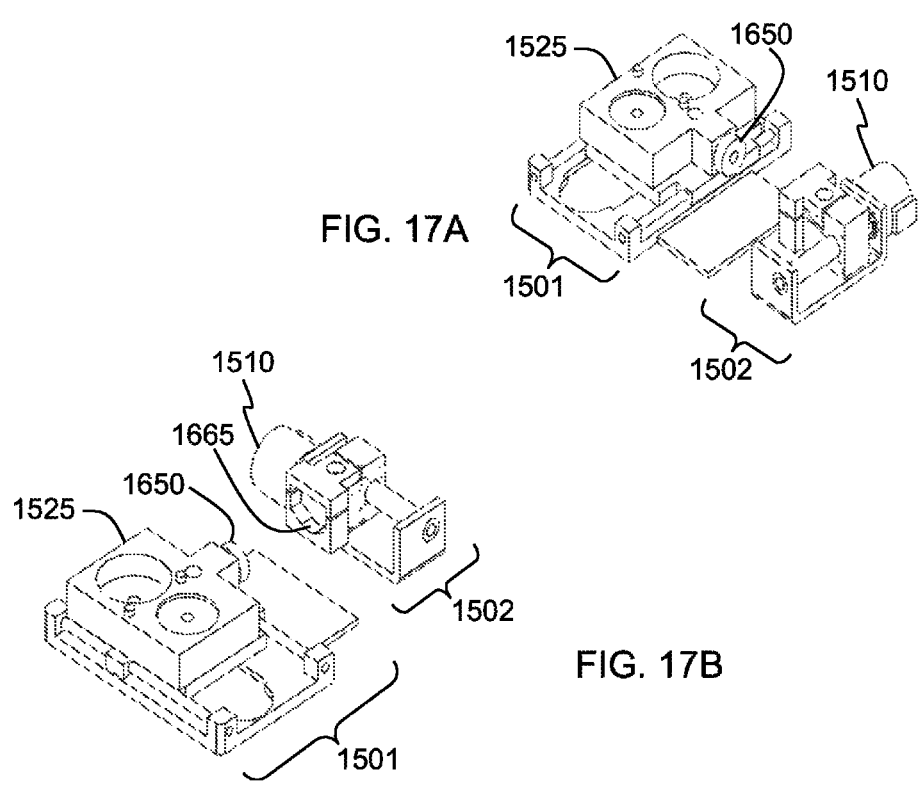
FIG. 17A
FIG. 17B

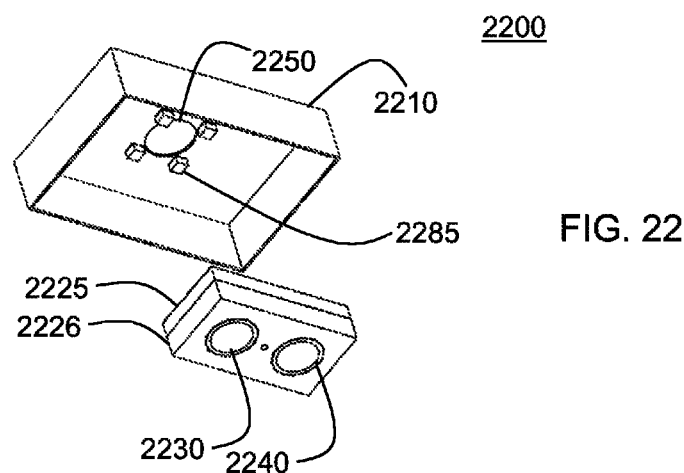
FIG. 22
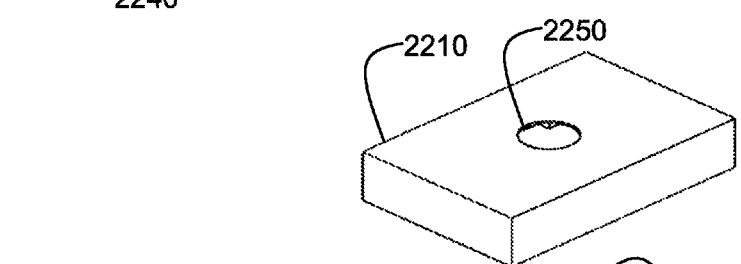
FIG. 23
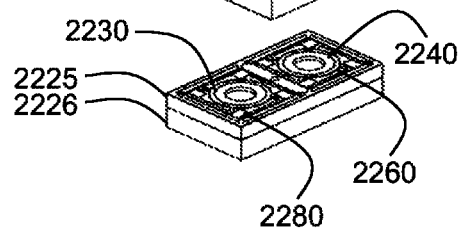
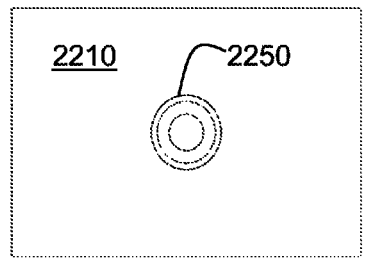
FIG. 24

INTERCHANGEABLE ZOOM LENS ACTUATOR WITH AUTO-FOCUS ADJUSTMENT

FIELD

The subject matter disclosed herein relates to an optical module that includes interchangeable lenses to adjust a zoom level or focus of the optical module.

BACKGROUND

Many portable electronic apparatuses, such as a cellular phone and/or a personal digital assistant (PDA) for example, may comprise a compact camera module, Such a module may comprise an image sensor, an imaging lens assembly, and/or an actuator to adjust the position of the imaging lens assembly with respect to the image sensor. As designers push towards slimmer, smaller, and/or lighter portable electronic apparatuses, compact camera module manufacturers, among others, are facing a challenge of providing smaller compact camera modules that can be manufactured with reduced cost by reducing manufacturing tolerances of an optical system of the camera modules.

BRIEF DESCRIPTION OF THE DRAWINGS

Non-limiting and non-exhaustive embodiments will be described with reference to the following objects, wherein like reference numerals refer to like parts throughout the various objects unless otherwise specified.

FIGS, 10A, 10B, 11A, and 11B are perspective and side views of a compact imaging module, according to an embodiment.

Figure 12:
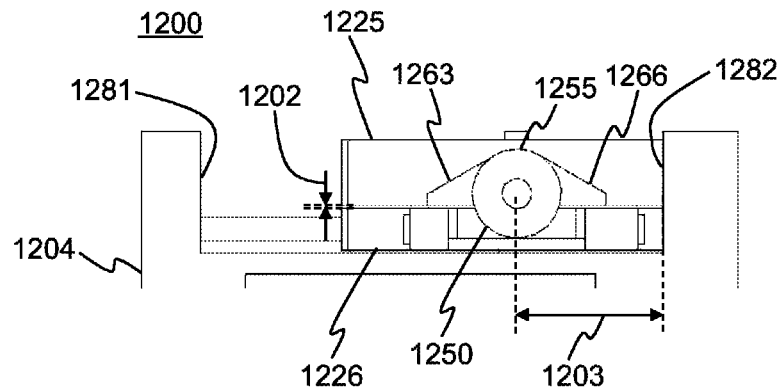
Figure 13:
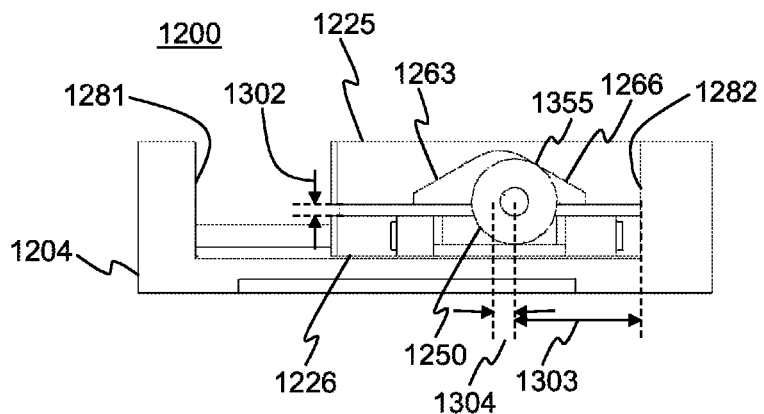

FIGS. 12 and 13 are side views of a compact imaging module, showing separation of lower and upper portions of a moveable platform, according to an embodiment.

FIGS. 14A, 14B, and 14C are side views showing some details of a portion of a mechanical drive for a compact imaging module, according to an embodiment.

FIG. 15 is a perspective view of a compact imaging module, according to another embodiment.

FIG. 16 is a side view showing some details of a portion of a mechanical drive for a compact imaging module, according to another embodiment.

FIGS. 17A and 17B are perspective views of compact imaging modules, according to various embodiments.

FIGS, 18A, 18B, and 18C are perspective views of a compact imaging module and schematic diagrams of magnetic actuators, according to embodiments.

Figure 19:
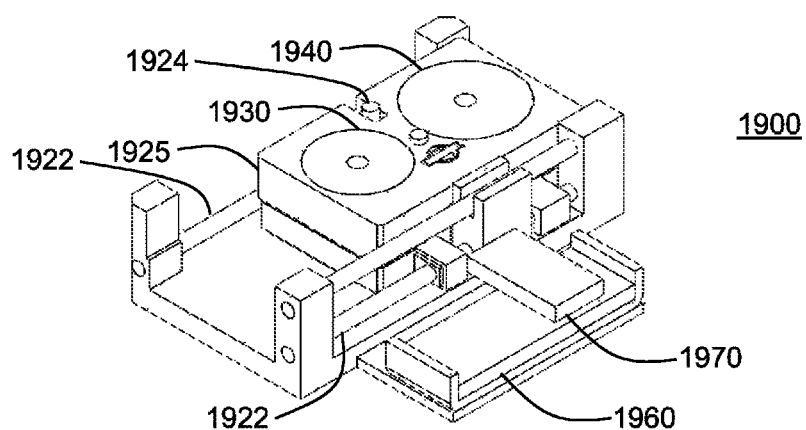

FIG. 19 is a perspective view of a compact imaging module, according to an embodiment.

FIGS. 20-23 are perspective views showing some details of tilt or rotation actuators of a compact imaging module, according to an embodiment.

FIG. 24 is a top view of an aperture for a compact imaging module, according to another embodiment.

Figure 25:
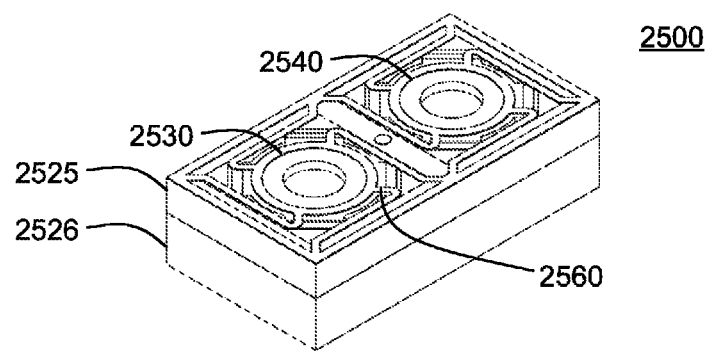
Figure 26:
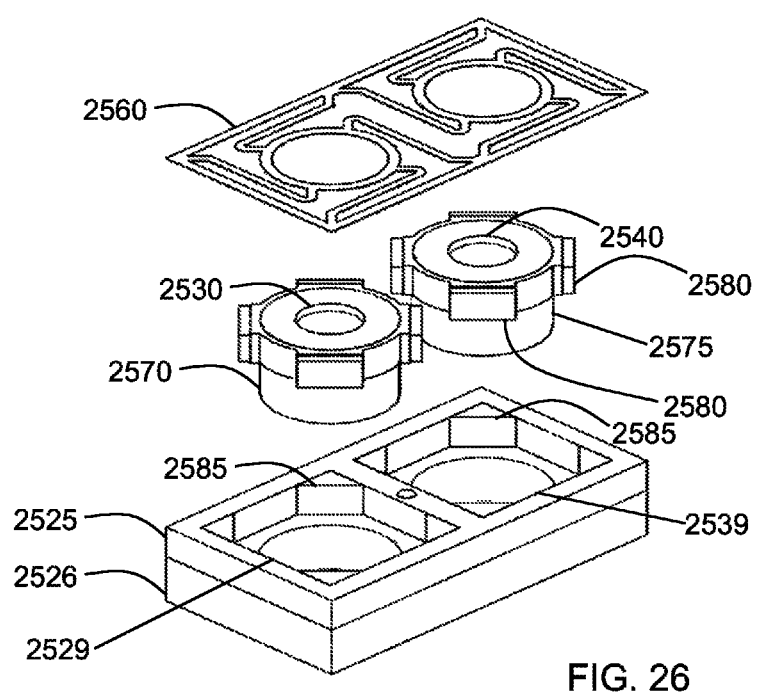

FIGS. 25 and 26 are perspective views showing some details of tilt or rotation mechanisms of a compact imaging module, according to another embodiment.

DETAILED DESCRIPTION

In the following detailed description, numerous specific details are set forth to provide a thorough understanding of claimed subject matter. However, it will be understood by those skilled in the art that claimed subject matter may be practiced without these specific details. In other instances, methods, apparatuses, or systems that would be known by one of ordinary skill have not been described in detail so as not to obscure claimed subject matter.

Reference throughout this specification to "one embodiment" or "an embodiment" may mean that a particular feature, structure, or characteristic described in connection with a particular embodiment may be included in at least one embodiment of claimed subject matter. Thus, appearances of the phrase "in one embodiment" or "an embodiment" in various places throughout this specification are not necessarily intended to refer to the same embodiment or to any one particular embodiment described. Furthermore, it is to be understood that particular features, structures, or characteristics described may be combined in various ways in one or more embodiments. In general, of course, these and other issues may vary with the particular context of usage. Therefore, the particular context of the description or the usage of these terms may provide helpful guidance regarding inferences to be drawn for that context.

Figure 1A:
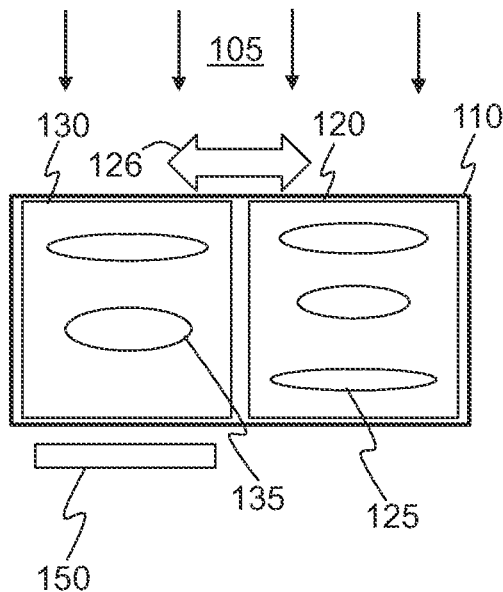
FIGS. 1A, 1B, and 1C include schematic cross-section views of lens assemblies and an image sensor, according to an embodiment.
Figure 1B:
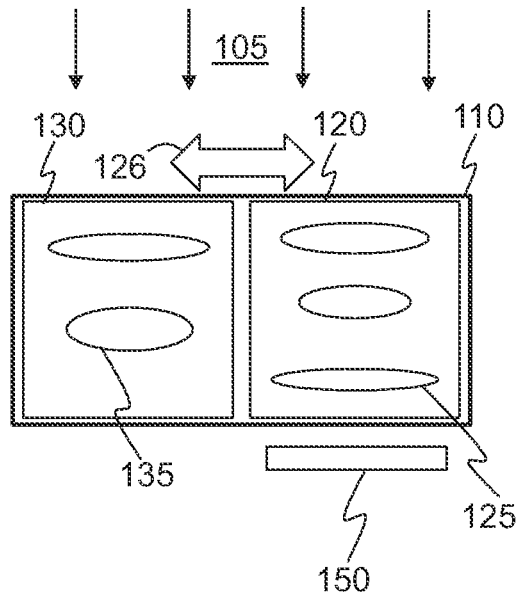
Figure 1C:
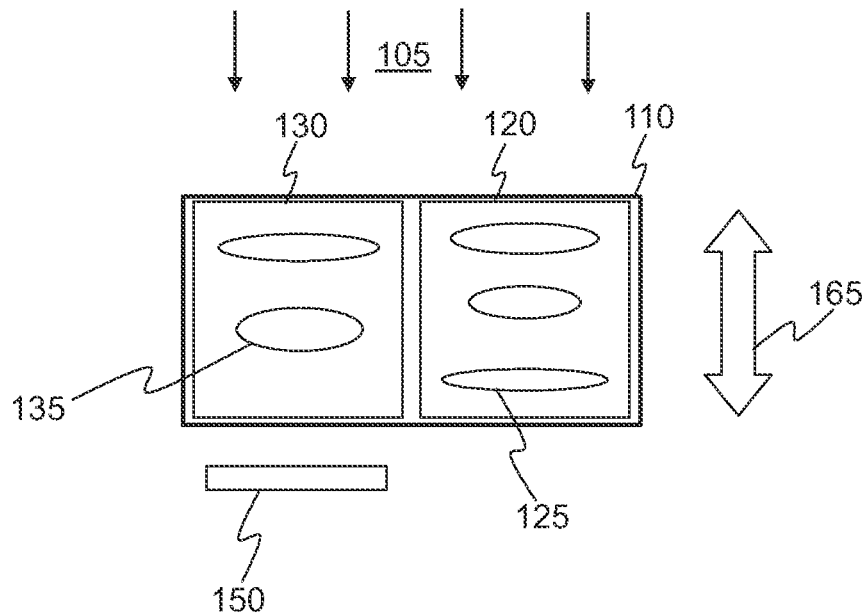

As used to describe such embodiments, terms "above", "below", "upper", "lower", "horizontal", "vertical", and "side" describe positions relative to an optical axis of such a compact imaging module. In particular, "above" and "below" refer to positions along an optical axis, wherein "above" refers to one side of an element and "below" refers to an opposite side of the element. Relative to such an "above" and "below", "side" refers to a side of an element that is displaced from an optical axis, such as the periphery of a lens, for example. Further, it is understood that such terms do not necessarily refer to a direction defined by gravity or any other particular orientation. Instead, such terms are merely used to identify one portion versus another portion. Accordingly, "upper" and "lower" may be equivalently interchanged with "top" and "bottom", "first" and "second", "right" and "left", and so on. "Horizontal" may refer to an orientation perpendicular to an optical axis while "vertical" may refer to an orientation parallel to the optical axis. Embodiments described herein include a compact imaging module that provides a mechanism and/or allows a process to adjust a zoom level by selecting one of two or more individual lens assemblies having different effective focal lengths. FIGS. 1A, 1B, and 1C include schematic cross-section views of lens assemblies and an image sensor, according to a particular embodiment. A first lens assembly 130 may comprise two or more optical elements 135, which may comprise a plurality of lenses, for example. A second lens assembly 120 may comprise two or more optical elements 125, which may comprise a plurality of lenses, for example. First lens assembly 130 may provide a different zoom level to the compact imaging device than that of second lens assembly 120, A selected lens assembly (e.g., lens assembly 120 or 130) may receive light 105 and provide an image to image sensor 150.

In FIG. 1A, a selected lens assembly may comprise first lens assembly 130 placed near an image sensor 150 to provide an image onto an active region (not shown) of the image sensor while unselected second lens assembly 120 may be set aside and placed away from the image sensor. In FIG. 1B, a selected lens assembly may comprise second lens assembly 120 placed near image sensor 150 to provide an image onto the image sensor while unselected first lens assembly 130 may be set aside and placed away from the image sensor. Selection of a particular lens assembly may be made by moving a platform or frame 110 in a direction indicated by arrow 126, for example.

A compact imaging module may also allow focus adjustments by selectively changing a distance between individual lens assemblies and an image sensor. For example, in FIG. 1C, selected first lens assembly 130 and unselected second lens assembly 120 may be moved in a direction indicated by arrow 165. A distance between a lens assembly and an image sensor, for example, may be adjustable, at least in part, in response to a mechanical force or an electromagnetic force, for example, A. distance may be measured along an optical axis of the lens assembly. In an implementation, a mechanical force to select among two or more lens assemblies and to adjust focus of the selected lens assembly may be generated by exactly a single electric motor or actuator, as described below. In a particular embodiment, for example, a structure of a compact imaging module, such as a compact camera module, may provide zoom capability, auto-focus, and/or other imaging functions by adjusting a distance between individual lens assemblies and an image sensor. A compact imaging module may provide an advantage to designers incorporating such a module into increasingly slimmer, smaller, and/or lighter portable electronic apparatuses, such as a compact camera or cell phone, for example. Of course, such details of a compact imaging module are merely examples, and claimed subject matter is not so limited.

In one embodiment, a compact imaging module may comprise a first lens assembly having a first effective focal length and a second lens assembly having a second effective focal length. The term "effective focal length" refers to a focal length of an assembly of individual lenses, as opposed to a focal length of an individual lens. A magnification or zoom level of a lens assembly may be based, at least in part, on the effective focal length of the lens assembly. Accordingly, a first lens assembly having a first effective focal length may produce an image having one zoom level and a second lens assembly having a second effective focal length may produce an image having another zoom level. A compact imaging module may comprise a moveable platform on which first and second lens assemblies may be mounted. An image sensor may receive light from the first lens assembly if the moveable platform is in a first position or the image sensor may receive light from the second lens assembly if the moveable platform is in a second position. In particular, a moveable platform may selectively place a first lens assembly or a second lens assembly in a position so that light transmitting through the selected lens assembly may be received by an image sensor. Meanwhile, an unselected lens assembly may be placed in a position so that any light transmitted through the unselected lens assembly may not be received by the image sensor. In one implementation, a compact imaging module may comprise one or more sensors to detect a position of the moveable platform. For example, position sensors may detect a horizontal and/or vertical position of the moveable platform with respect to a reference position.

A compact imaging module may comprise a single mechanical power source to move a moveable platform to a first position or a second position and to change a distance between an image sensor and the moveable platform, Such a mechanical power source may generate torque or other force in response to receiving electrical current. A mechanical power source may comprise an electrical motor, for example. In some implementations, "mechanical power source" refers to a device that converts mechanical energy (or power) from electrical energy (or power). In some implementations, "mechanical power source" refers to an electrical motor and need not include gears, worm drives, screws, or any other type of mechanical elements other than a shaft of the motor, for example.

Motion may comprise a linear vertical motion, for example. Changing such a distance may adjust a focus of the lens assemblies with respect to the image sensor. In other words, a distance between a lens assembly and an image sensor may be adjusted so that a focused image produced by the lens assembly is received by the image sensor.

In one implementation, a single actuator may comprise a motor to move a rolling or sliding element along a range of positions in a horizontal direction. Moving a platform to a first position or a second position may provide a technique for selecting a first lens assembly having a first effective focal length or a second lens assembly having a second effective focal length to be placed in front of an image sensor. Accordingly, by operating an actuator to change a position of a moveable platform in a horizontal direction, a zoom level of a compact imaging module may be selected among two values (or three or more values in a case where a compact imaging module comprises three or more individual lens assemblies). For example, a moveable platform in a first position placing a first lens assembly in front of an image sensor may enable a compact imaging module to have a first zoom level. The moveable platform in a second position to place a second lens assembly in front of the image sensor may enable a compact imaging module to have a second zoom level.

At particular portions of the range of positions in the horizontal direction, the sliding element may apply a force to the moveable platform in a vertical direction (e.g., perpendicular to the horizontal direction), substantially parallel to an optical axis of the lens assemblies. The single actuator that provides motion to a moveable platform in a direction along an optical axis may provide a relatively precise control of motion of one or more lens assemblies located on the moveable platform. For example, such an actuator may provide a continuous, linear motion so that distance between a selected lens assembly and an image sensor may be adjusted by any amount. Such adjustments may be made, for example, to focus an image of a lens assembly onto an image sensor. For example, the actuator may produce varying magnitudes of vertical displacement of an upper portion of a moveable platform based, at least in part, on a varying magnitude of horizontal displacement of a portion of the actuator, as described below. Such varying magnitudes may provide varying distances between a lens assembly and an image sensor to precisely control a focus of light onto the image sensor.

In another implementation, a single actuator may comprise a motor to move a sliding element along a range of positions in a first direction so as to move a moveable platform to first and second positions, wherein at particular portions of the range the sliding element may apply a force to the moveable platform so as to change a distance between the image sensor and the moveable platform. Of course, such details of actuators are merely examples, and claimed subject matter is not so limited.

In one embodiment, a compact imaging module may comprise a lens platform comprising an upper portion and a lower portion. The upper portion may support a first lens assembly having a first effective focal length and a second lens assembly having a second effective focal length. For example, the first and second lens assemblies may be mounted to and physically supported by the upper portion of the lens platform, An image sensor may receive light from a first lens assembly if the lens platform is in a first position or the image sensor may receive light from a second lens assembly if the lens platform is in a second position. A drive mechanism may move the lens platform in a horizontal direction to select the first or second lens assembly to be optically aligned with the image sensor, for example.

The upper portion of the lens platform may include an inclined and/or curved surface portion to interact with the drive mechanism to convert motion in the horizontal direction to motion in a vertical direction to change a distance between the image sensor and the upper portion. Focus of either of the lens assemblies may be adjusted by such changing of the distance. Of course, such details of a compact imaging module are merely examples, and claimed subject matter is not so limited.

Figure 2:
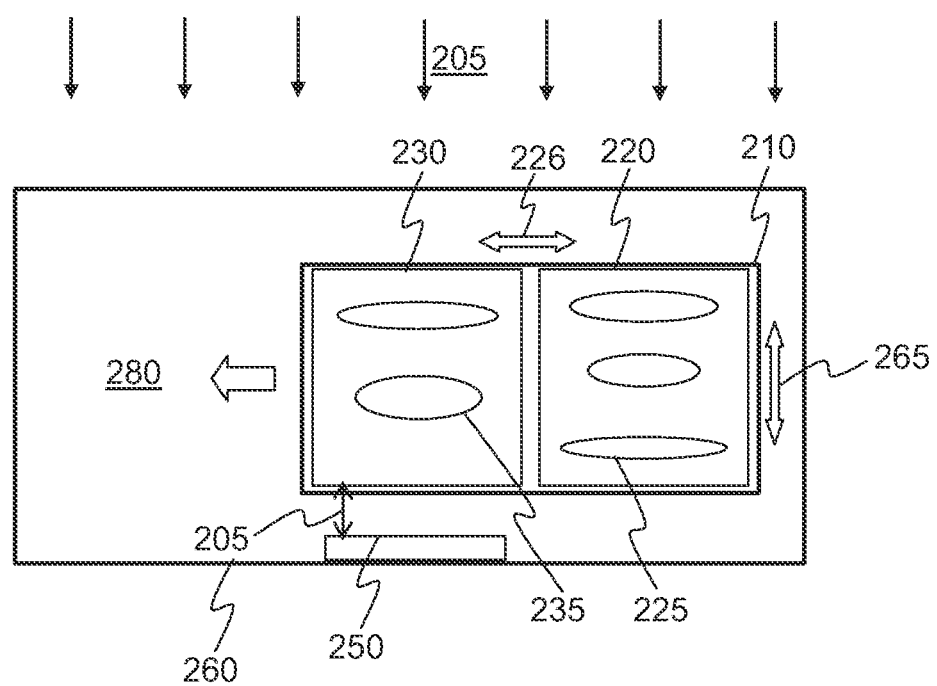
FIG. 2 includes a schematic cross-section view of lens assemblies and an image sensor, according to another embodiment.

FIG. 2 includes a schematic cross-section view of lens assemblies and an image sensor of a compact imaging module 260, according to another embodiment. A first lens assembly 230 may comprise two or more optical elements 235, which may comprise a plurality of lenses, for example. A second lens assembly 220 may comprise two or more optical elements 225, which may comprise a plurality of lenses, for example. First lens assembly 230 may provide a different zoom level to the compact imaging device than that of second lens assembly 220. A selected lens assembly (e.g., lens assembly 220 or 230) may receive light 205 and provide an image to image sensor 250. The image sensor may include an active region (not shown) comprising an array of pixilated charge-coupled devices (CCD) and/or one or more complementary metal-oxide-semiconductor (CMOS) devices, just to name a few examples. Image sensor 250 may also comprise an inactive region (not shown) at least partially surrounding an active region. Such an inactive region may comprise a border or frame for an active region that may be used to physically support other portions of a compact imaging module without interfering with light impinging on the active region.

In the case shown in FIG. 2, a selected lens assembly may comprise first lens assembly 230 placed near an image sensor 250 to project an image onto an active region (not shown) of the image sensor while unselected second lens assembly 220 may be set aside and placed away from the image sensor. Selection of first lens assembly 230 or second lens assembly 220 may be made by moving a platform or frame 210 in a direction indicated by arrow 226, for example. A compact imaging module may also allow focus adjustments by selectively changing a distance 205 between individual lens assemblies and an image sensor. For example, selected first lens assembly 230 and unselected second lens assembly 220 may be moved in a direction indicated by arrow 265. A distance between a lens assembly and an image sensor, for example, may be adjustable, at least in part, in response to an electromagnetic force generated by one or more magnets and a coil, as described below.

Figure 3:
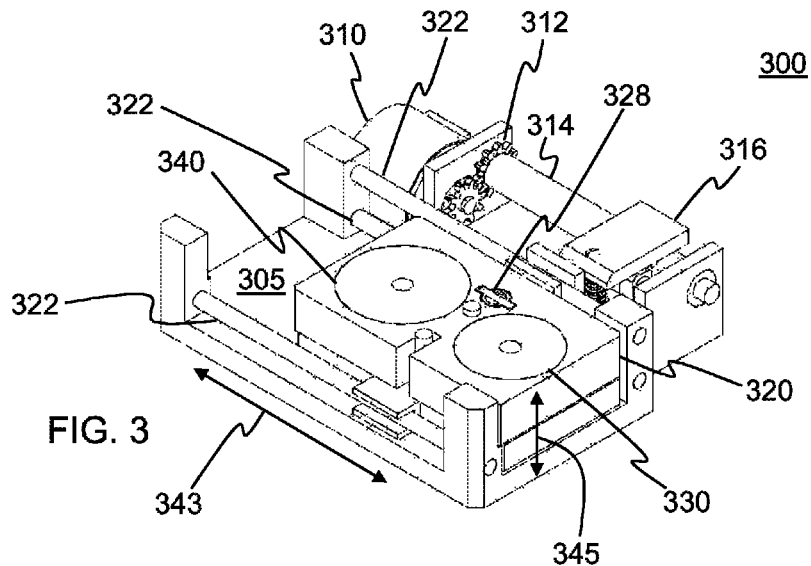
FIG. 3 is a perspective view of a compact imaging module, according to an embodiment.
Figure 4:
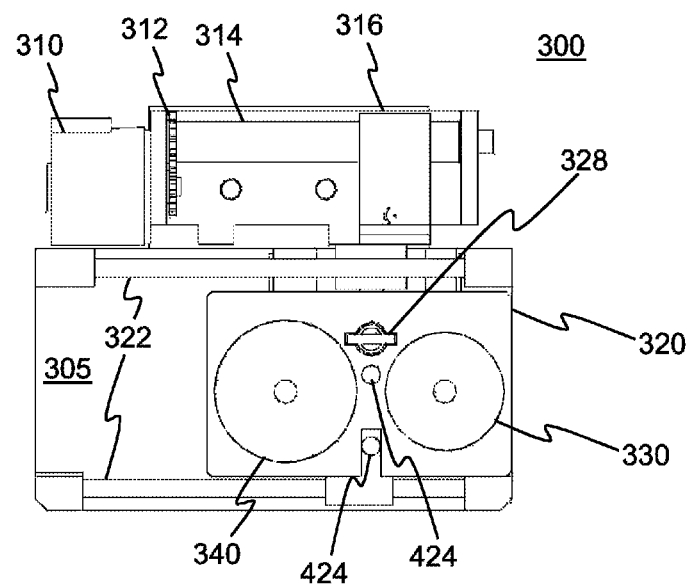
FIG. 4 is a top view of a compact imaging module, according to an embodiment.

FIG. 3 is a perspective view and FIG. 4 is a top view of a compact imaging module 300, according to an embodiment, Such a compact imaging module may comprise a first lens assembly 330 having a first effective focal length and a second lens assembly 340 having a second effective focal length. A compact imaging module may comprise a moveable platform 320 on which first and second lens assemblies may be mounted. An image sensor (not shown in FIG. 3) may receive an image from second lens assembly 320 if the moveable platform is in a position that places second lens assembly 340 over the image sensor. On the other hand, though not shown, the image sensor may receive an image from first lens assembly 330 if the moveable platform is in a position that places first lens assembly 330 over the image sensor. In this case, unselected lens assembly 340 may be placed in a position so as to occupy a space 305 so that any light transmitted through unselected lens assembly 340 will not be received by the image sensor.

Compact imaging module 300 may comprise an actuator including a number of portions. For example, an actuator may include a motor or a stepper motor 310, driving force transmission gears 312, screw drive 314, and clamp 316, though claimed subject matter is not limited in this respect. Such a clamp may mechanical connect an actuator with a moveable platform to transmit actuator forces to the platform, for example. Such an actuator may move moveable platform 320 along guiding pins 322 in a first or horizontal direction, indicated by arrow 343, for example. However, the same actuator may move moveable platform 320 along guiding pins 424 in a second or vertical direction, indicated by arrow 345, for example. Portions of the actuator that allow for both horizontal motion and vertical motion are explained and shown in figures below. A pre-load spring 328 may be used to provide a compressive force to compress the upper portion of moveable platform 320 with respect to the lower portion of the moveable platform. Of course, such details of compact imaging module 300 are merely examples, and claimed subject matter is not so limited.

Figure 5:
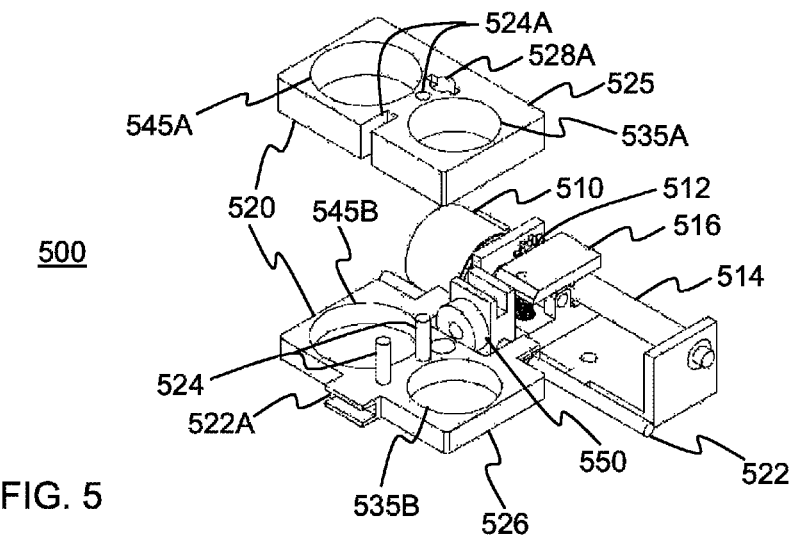
FIGS. 5 and 6 are perspective views of a compact imaging module, according to an embodiment.

FIG. 5 is a perspective view of a compact imaging module 500, according to an embodiment. Such a compact imaging module may include a moveable platform 520 comprising an upper portion 525 and a lower portion 526. Upper portion 525 may include a first cavity 535A to receive a first lens assembly and a second cavity 545A to receive a second lens assembly. Lower portion 526 may include a first cavity 535B to receive the first lens assembly and a second cavity 545B to receive the second lens assembly. Lower portion 526 may also include guiding pins 524 upon which upper portion 525 is guided via hole/slot 524A. Upper portion may include a recess 528A for a pre-load spring (e.g., 628 in FIG. 6) that may be used to provide a compressive force to compress the upper portion of moveable platform 520 with respect to the lower portion of the moveable platform. In one implementation, upper portion 525 may include an inclined and/or curved surface portion (e.g., 665 in FIG. 6) comprising a recessed region to receive a drive mechanism or slide 550.

Compact imaging module 500 may comprise an actuator including a number of portions. For example, an actuator may include a motor or a stepper motor 510, driving force transmission gears 512, screw drive 514, and clamp 516. Such an actuator may move moveable platform 520 along guiding pins. For example, FIG. 5 shows one such guiding pin 522 and a slot 522A to receive another guiding pin. However, the same actuator may move moveable platform 520 along guiding pins 524 in a vertical direction. Portions of the actuator that allow for both horizontal motion and vertical motion are explained and shown in figures below. Of course, such details of compact imaging module 500 are merely examples, and claimed subject matter is not so limited.

Figure 6:
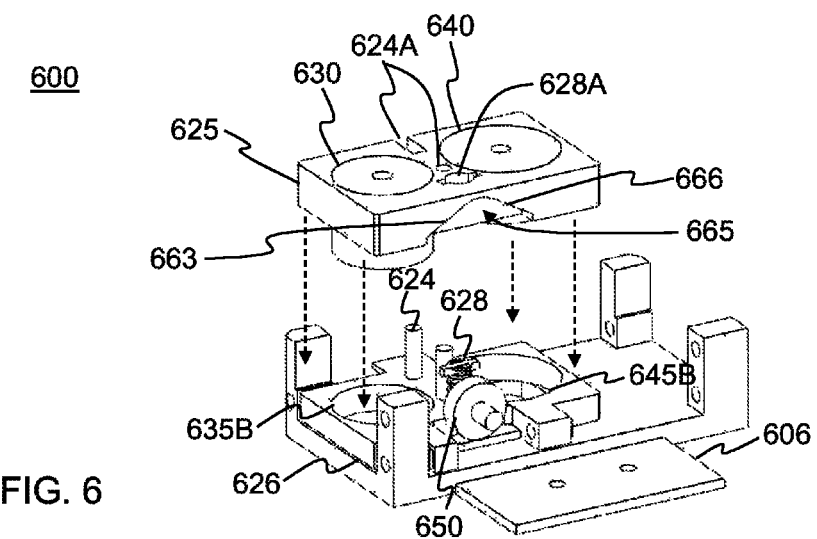
Figure 7:
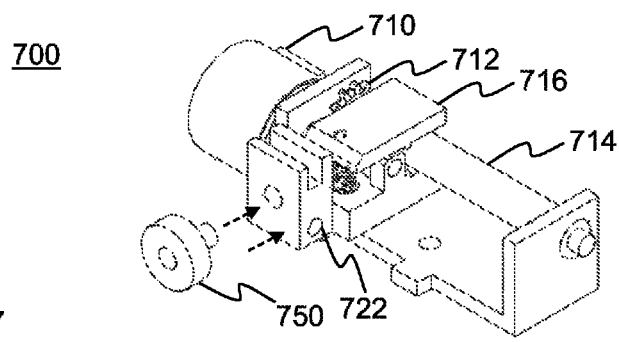
FIG. 7 is a perspective view of an actuator or mechanical drive for a compact imaging module, according to an embodiment.

FIG. 6 is a perspective view of a compact imaging module 600, according to an embodiment. Such a compact imaging module may be similar to 500, but is shown from a different direction and without some actuator portions, which may rest on platform 606, for example. As described above, a compact imaging module may include a moveable platform comprising an upper portion 625 and a lower portion 626, Upper portion 625 may include a first cavity (e.g., 535A) to receive a first lens assembly 630 and a second cavity (e.g., 545A) to receive a second lens assembly 640, Lower portion 626 may include a first cavity 635B to receive the first lens assembly and a second cavity 645B to receive the second lens assembly. Lower portion 626 may also include guiding pins 624 upon which upper portion 625 is guided via hole/slot 624A. Upper portion may include a recess 628A for a pre-load spring 628 that may be used to provide a compressive force to compress the upper portion of moveable platform with respect to the lower portion of the moveable platform.

In one implementation, upper portion 625 may include an inclined and/or curved surface portion 665 (referred to hereinafter as "inclined surface portion") comprising a first side 663 and a second side 666, for example. In one sense, inclined surface portion 665 comprises a recessed region having an angular contact edge of upper portion 625. For example, this angular contact edge may be inclined and/or curved with respect to a top surface of the moveable platform, such as a top surface of upper portion 625. This recessed region may receive a drive mechanism or slide 650. As explained in detail below, interaction of slide 650 with inclined surface portion 665 may transfer a mechanical force in a horizontal direction (imparted by portions of an actuator shown in FIG. 5, for example) to a mechanical force in a vertical direction. Such a force in a vertical direction may be used to change a distance between an image sensor and upper portion 625 that includes first and second lens assemblies 630 and 640, for example. Slide 650 may roll and/or slide as it moves in a horizontal direction. Of course, such details of compact imaging module 600 are merely examples, and claimed subject matter is not so limited.

FIG, 7 is a perspective view of a portion of an actuator 700 for a compact imaging module, according to an embodiment. As described above, an actuator may include a number of parts. For example, an actuator may include a motor or a stepper motor 710, driving force transmission gears 712, screw drive 714, and clamp 716. Such an actuator may move a moveable platform (e.g., 520) along guiding pins, one of which may be received by hole 722. Actuator 700 may further include a slide 750 to protrude into a recessed region defined, at least in part, by an inclined surface portion (e.g., 665) of an upper portion of a moveable platform. Of course, such details of actuator 700 are merely examples, and claimed subject matter is not so limited.

Figure 8:
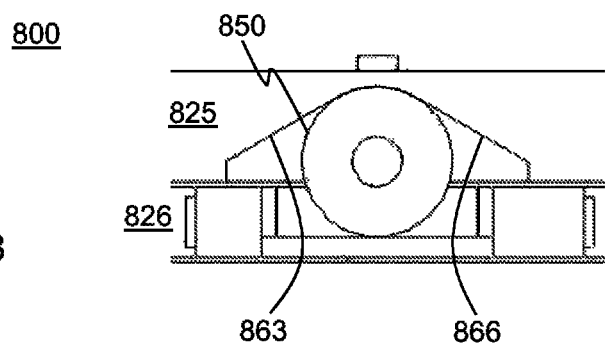
FIG. 8 is a side view of a portion of an actuator for a compact imaging module, according to an embodiment.

FIG. 8 is a side view of a portion 800 of an actuator and a portion of a moveable platform for a compact imaging module, according to an embodiment. Upper portion 825 may include an inclined surface portion comprising a first side 863 and a second side 866. The inclined surface portion, as mentioned above, may comprise a recessed region to receive slide 850, Part of a lower portion 826 of the moveable platform is also shown.

Figure 9:
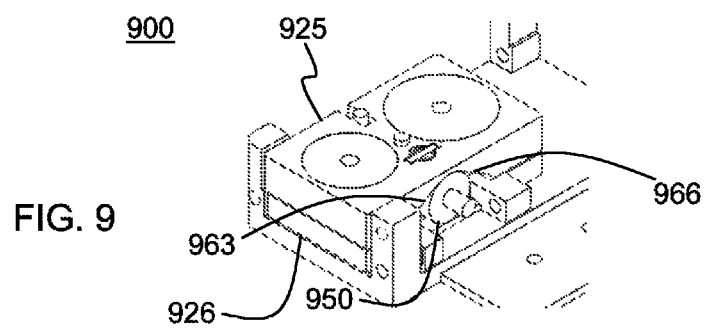
FIG. 9 is a perspective view showing some details of a portion of an actuator for a compact imaging module, according to an embodiment.

FIG. 9 is a perspective view showing some details of a portion of an actuator for a compact imaging module, according to an embodiment 900. Upper portion 925 of a moveable platform may include an inclined surface portion comprising a first side 963 and a second side 966. The inclined surface portion, as mentioned above, may comprise a recessed region, to receive slide 950. Part of a lower portion 926 of the moveable platform is also shown.

Figures 10A, 10B:
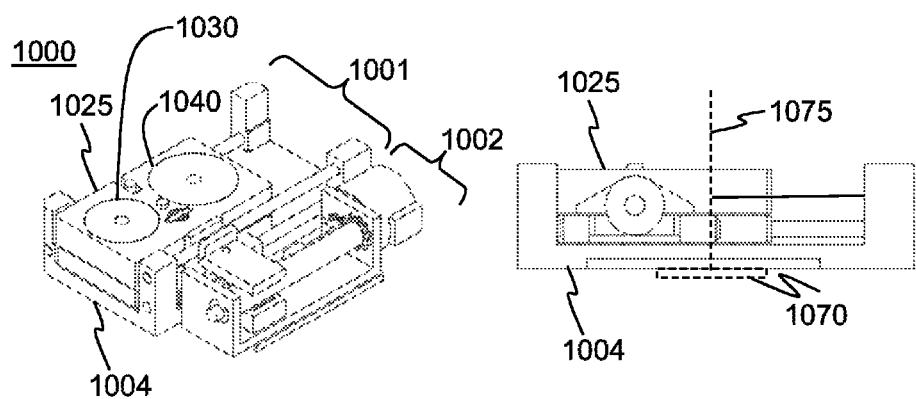
Figures 11A, 11B:
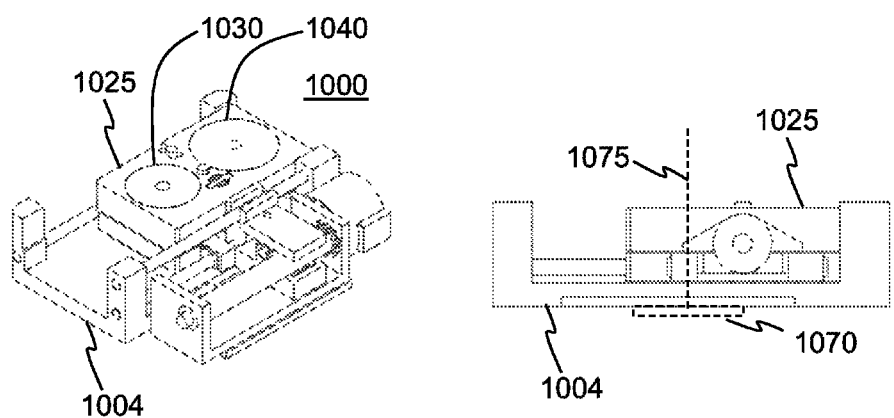

FIGS, 10A, 10B, 11A, and 11B are perspective and side views of a compact imaging module 1000, according to an embodiment. The compact imaging module may comprise a platform/optical portion 1001 and a mechanical drive portion 1002, for example. The platform/optical portion 1001 may include a moveable platform 1025, a platform base 1004, and an image sensor 1070 having an optical axis 1075. FIGS. 10A and 10B show compact imaging module 1000 in a configuration so that a second lens assembly 1040 is aligned with image sensor 1070. FIGS. 11A and 11B show compact imaging module 1000 in a configuration so that a first lens assembly 1030 is aligned with image sensor 1070.

FIGS. 12 and 13 are side views of a compact imaging module 1200, showing separation of lower and upper portions of a moveable platform, according to an embodiment. The compact imaging module may include a moveable platform comprising an upper portion 1225 and a lower portion 1226. The upper portion may include an inclined surface portion comprising a first side 1263 and a second side 1266, The inclined surface portion, as mentioned above, may comprise a recessed region to receive slide 1250, The compact imaging module may further include a platform base 1204 comprising physical barriers such as a first stop 1281 and a second stop 1282, either of which may provide a range limit to horizontal movement of the moveable platform, for example. Horizontal movement of slide 1250 may be driven by a mechanical drive or actuator, which is not shown in FIGS. 12 or 13. Accordingly, movement of slide 1250 may impart a horizontal movement to upper portion 1225 of the moveable platform via contact point 1255. Here it is understood that contact point 1255 may comprise more than one point and may comprise a finite surface area, depending on a shape of slide 1250 and a shape of inclined surface portions 1263 and 1266, for example.

Slide 1255 may move the moveable platform in a horizontal range spanning from first stop 1281 to second stop 1282. If slide 1250 continues to move beyond the horizontal range where the moveable platform contacts either the first or second stops 1281 or 1282, the slide may impart a vertical motion to upper portion 1225. For example, in FIG. 12 the moveable platform is in contact with second stop 1282, The center of slide 1250 is a distance 1203 from the second stop and is contact with upper portion 1225 of the moveable platform at point 1255. A vertical displacement of the upper portion is indicated by arrows 1202. In FIG. 13, the moveable platform continues to be in contact with second stop 1282. Because of the second stop on the right, the moveable platform cannot move any further to the right. Slide 1250, however, is able to move further to the right. As the slide moves further to the right, it imparts a vertical motion (e.g., lifting) to upper portion 1225 of the moveable platform to create a vertical displacement indicated by arrows 1302.

Compared to the situation in FIG. 12, the center of slide 1250 has moved further toward second stop 1282 so that a distance 1303 from the second stop to the center of the slide is reduced from 1203 by a distance 1304. Accordingly, a contact point between slide 1250 and inclined surface portions 1263 and 1266 has moved to point 1355, which is lower than point 1255. If the moveable platform is stopped by second stop 1282, then slide 1250 may interact with upper portion 1225 of the moveable platform via surface portion 1266. On the other hand, if the moveable platform is stopped by first stop 1281, then slide 1250 may interact with upper portion 1225 of the moveable platform via surface portion 1263.

As explained above, slide 1250 imparting a vertical motion to upper portion 1225 of the moveable platform may provide a technique to change a distance between an image sensor and a lens assembly in the moveable platform. Changing such a distance may adjust a focus of the lens assembly with respect to the image sensor. Of course, such details of compact imaging module 1200 are merely examples, and claimed subject matter is not so limited.

FIGS. 14A, 14B, and 14C are side views showing various configurations of a slide, according to embodiments 1400, 1401, and 1402. Slides 1450, 1451, or 1452 comprise merely a few examples of possible configurations.

FIG. 15 is a perspective view of a compact imaging module 1500, according to another embodiment. The compact imaging module may comprise a platform/optical portion 1501 and a mechanical drive portion 1502, for example. The platform/optical portion 1501 may include a moveable platform comprising an upper portion 1525 that includes a first cavity 1530 to receive a first lens assembly and a second cavity 1540 to receive a second lens assembly. Guiding pins 1522 may be used to guide the moveable platform along a horizontal direction. Mechanical drive portion 1502 may comprise an actuator including a number of portions. For example, an actuator may include a motor or a stepper motor 1510 and screw drive 1514. Such an actuator may move the moveable platform along guiding pins 1522.

Compact imaging module 1500 may be similar to compact imaging module 600, for example, except that instead of a slide comprising a portion of a mechanical drive portion (e.g., 1502), the slide may comprise a portion of the moveable platform. Another difference may be that mechanical drive portion 1502 may include an inclined surface portion as opposed to the former case where a moveable platform included an inclined surface portion (e.g., 665). Of course, such details of compact imaging module 1500 are merely examples, and claimed subject matter is not so limited.

FIG. 16 is a side view showing some details of a portion 1600 of a mechanical drive, such as 1502, for example, for compact imaging module 1500, according to an embodiment. The mechanical drive portion 1600 may include an inclined surface portion comprising a first side 1663 and a second side 1666, for example. In one sense, this inclined surface portion comprises a recessed region having an angular contact edge. This recessed region may receive slide 1650. As explained above, interaction of slide 1650 with an inclined surface portion may impart a vertical motion to a moveable platform.

FIGS. 17A and 17B are perspective views of compact imaging module 1500 from different directions, according to various embodiments. FIG. 17A shows upper portion 1525 of a moveable platform that includes slide 1650. Motor 1510 is also shown for reference. FIG. 17B shows upper portion 1525 of the moveable platform that includes slide 1650. Mechanical drive portion 1502 may include inclined surface portion 1665 to receive slide 1650. Again, motor 1510 is also shown for reference.

Figure 18A:
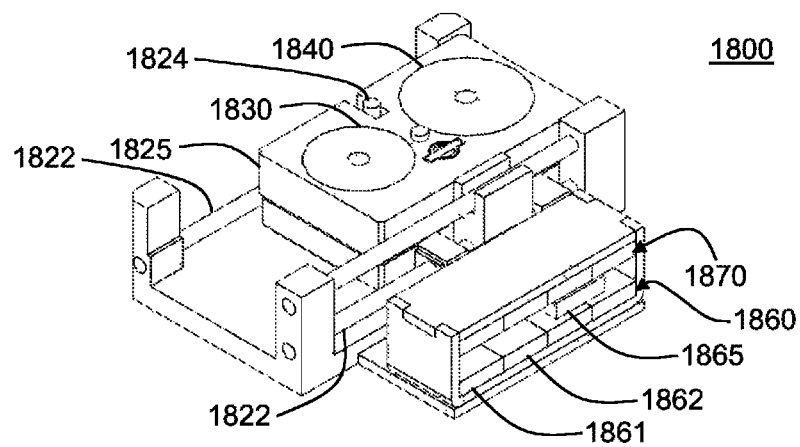

FIG. 18A is a perspective view of a compact imaging module 1800, according to another embodiment. Compact imaging module 1800 may be similar to compact imaging modules described above, such as 600 or 1500, for example. Among differences, however, is that compact imaging module 1800 may comprise an electro-mechanical actuator. For example, such an electro-mechanical actuator may include a lower set of permanent magnets 1860, an upper set of permanent magnets 1870, and an electromagnetic coil 1865 disposed between the lower and upper sets of magnets. In an alternative embodiment, an electro-mechanical actuator may instead include a lower set of electromagnetic coils 1860, an upper set of electromagnetic coils 1870, and a permanent magnet 1865 disposed between the lower and upper sets of coils.

A magnet may comprise a permanent magnet made from a material that is magnetized to create its own persistent magnetic field. Such a material may comprise, for example, a ferromagnetic material such as iron, nickel, cobalt, or some alloys of rare earth metals, just to name a few examples. A coil may comprise a wound coil, a printed coil, or an electroplated coil on a substrate, for example. A compact imaging module may comprise a spring to provide a restoring force to a moveable platform that supports two or more lens assemblies lens assembly. Of course, such details of a compact imaging module are merely examples, and claimed subject matter is not so limited.

In a first embodiment, both lower and upper sets of magnets individually comprise magnets that are arranged so that adjacent magnets have opposing magnetic poles. For example, if the north pole of magnet 1861 is facing upward (e.g., toward coil 1865), then the south pole of adjacent magnet 1862 may be facing upward, and vice versa. Such an arrangement of lower and upper sets of magnets may interact with coil 1865 so that coil 1865 may move horizontally and/or vertically based, at least in part, on an amount of electric current supplied to coil 1865, for example.

Coil 1865 may be physically attached to upper portion 1825 of a moveable platform that includes a first lens assembly 1830 and a second lens assembly 1840, Guiding pins 1822 may be used to guide the moveable platform along a horizontal direction and guiding pins 1824 may be used to guide the moveable platform along a vertical direction. Of course, such details of compact imaging module 1800 are merely examples, and claimed subject matter is not so limited.

In another embodiment, coil 1865 may be configured to move only in a horizontal direction. In such a case, upper portion 1825 of the moveable platform may include an inclined surface portion, such as 665 in FIG. 6, for example, comprising a first side and a second side. This recessed region may receive a drive mechanism or slide. As explained in detail above, interaction of the slide with an inclined surface portion may transfer a mechanical force in a horizontal direction (imparted by coil 1865, for example) to a mechanical force in a vertical direction. Such a force in a vertical direction may be used to change a distance between an image sensor and upper portion 1825 that includes first and second lens assemblies 1830 and 1840, for example. Of course, such details of compact imaging module 1800 are merely examples, and claimed subject matter is not so limited.

Figure 18B:
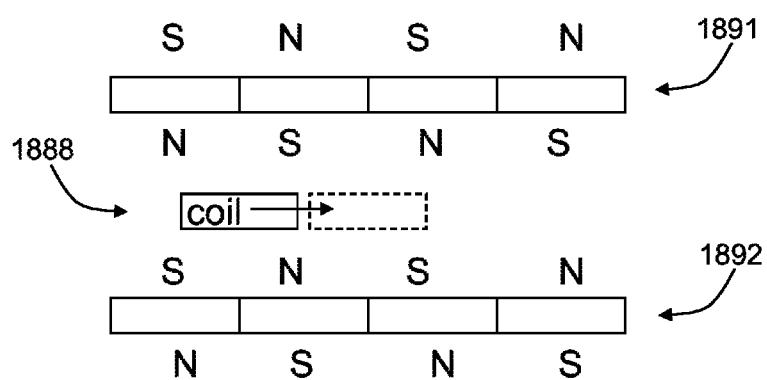

FIG. 18B shows a schematic diagram of an arrangement of upper permanent magnets 1891, lower permanent magnets 1892, and magnetic coil 1888, according to an implementation. Magnetic poles of upper magnets 1891 may be arranged alternately. Furthermore, magnetic poles of lower magnets 1892 may be opposite that of corresponding upper magnet. If the direction of electrical current in coil 1888 sequentially changes, the coil may induce a horizontal force to generate horizontal motion. Such motion of coil 1888 may drive the upper portion 1825 of a moveable platform to move horizontally. Additionally, by an interaction of roller and inclined surface (e.g., as shown in FIG. 16), the moveable platform may also move vertically.

Figure 18C:
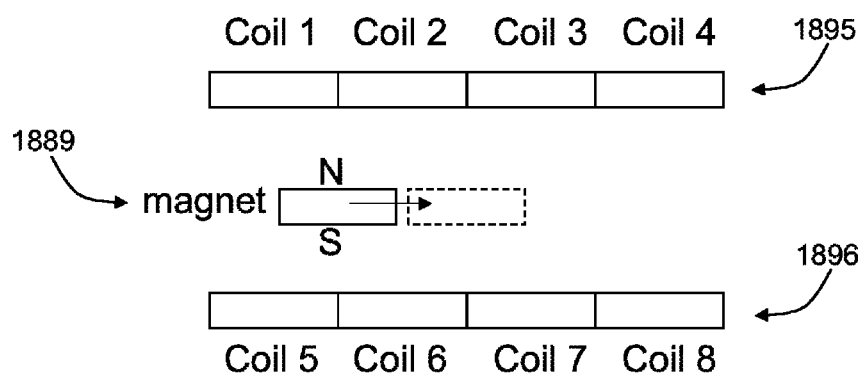

FIG. 18C shows a schematic diagram of an arrangement of upper magnetic coil array 1895, lower magnetic coil array 1896, and a permanent magnet 1889, according to an implementation. For the upper coil array 1895, electrical current directions of individual coils are opposite that of adjacent coils. Furthermore, the electrical current directions of lower coils of array 1896 may be opposite that of corresponding upper coils. If the direction of electrical current in coils sequentially changes, the magnet 1889 may induce a horizontal force to generate horizontal motion. Such motion of magnet 1889 may drive the upper portion 1825 of a moveable platform to move horizontally. Additionally, by an Interaction of roller and inclined surface (e.g., as shown in FIG. 16), the moveable platform may also move vertically.

FIG. 19 is a perspective view of a compact imaging module 1900, according to another embodiment. Compact imaging module 1900 may be similar to compact imaging modules described above, such as 600, 1500, or 1800, for example. Among differences, however, is that compact imaging module 1900 may comprise a piezoelectric actuator. For example, such a piezoelectric actuator may include a lower portion 1960 and an upper portion 1970. Upper portion 1970 may be physically attached to upper portion 1925 of a moveable platform that includes a first lens assembly 1930 and a second lens assembly 1940. Such a piezoelectric actuator may generate a horizontal force to drive the moveable platform to change position with respect to lower portion 1960, for example. Guiding pins 1922 may be used to guide the moveable platform along a horizontal direction and guiding pins 1924 may be used to guide the moveable platform along a vertical direction.

In an implementation, a shaped memory alloy (SMA) may comprise a material, such as a metallic wire, for example, that may contract in response to an applied electric current. For example, an SMA may comprise an alloy that "remembers" its original, cold-forged shape: returning to a pre-deformed shape by heating. Examples of SMA materials include copper-zinc-aluminum-nickel, copper-aluminum-nickel, nickel-titanium (NiTi) alloys, and zinc, copper, gold and iron alloys, just to name a few examples. For example, an electric current applied to an SMA wire may lead to contraction (e.g., shortening) of the SMA wire. Accordingly, the contracting SMA wire may impart a force to move in a direction to move a moveable platform, Of course, such details of compact imaging module 1900 are merely examples, and claimed subject matter is not so limited.

Figure 20:
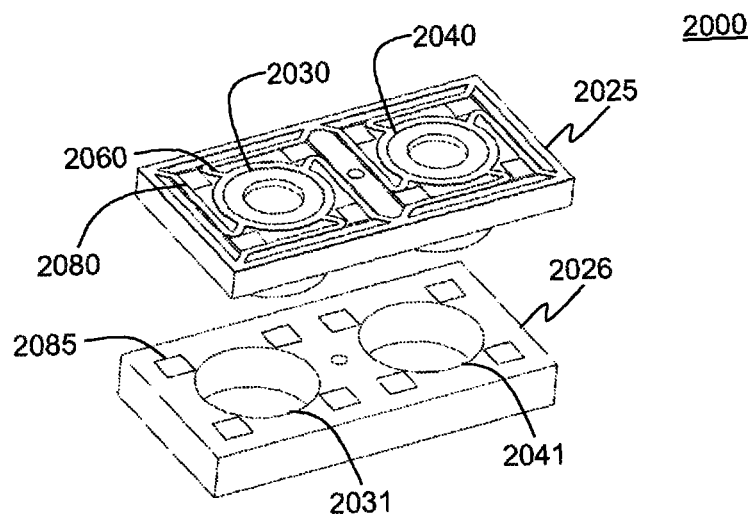
Figure 21:
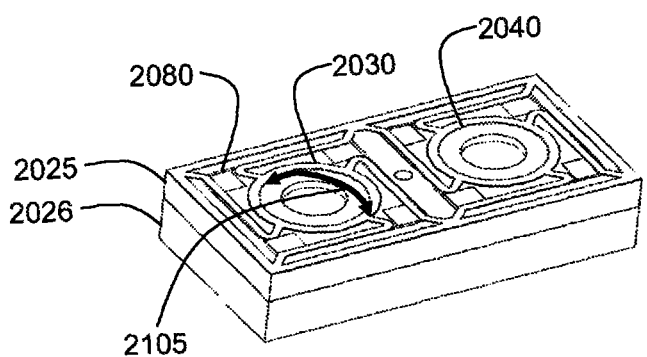

FIGS. 20 and 21 are perspective views showing some details of tilt or rotation actuator of a compact imaging module, according to an embodiment. Applied to an optical device, for example, such a tilt or rotation actuator may be used to compensate for unwanted vibration to perform an anti-shaking function (e.g., image stabilization), though claimed subject matter is not so limited.

A moveable platform 2000 may comprise such a tilt or rotation actuator, for example. Accordingly, moveable platform 2000 may include an upper portion 2025 and a lower portion 2026. Lower portion 2026 may comprise a first cavity 2031 to receive a first lens unit and a second cavity 2041 to receive a second lens unit. Upper portion 2025 may comprise a first lens holder 2030 to receive the first lens unit, a second lens holder 2040 to receive the second lens unit, and springs 2060, which may comprise leaf springs, for example. In one implementation, one such spring may be attached between a first lens unit and a portion of upper portion 2025, and another such spring may be attached between a second lens unit and a portion of upper portion 2025, Springs 2060 may provide a restoring force to the lens units as the lens units are rotated and/or tilted from their neutral positions (e.g., which may be in-line with an optical axis of an image sensor). Such rotation and/or tilting may be implemented by coils/magnets 2080 disposed in upper portion 2025 interacting with magnets/coils 2085 disposed in lower portion 2026, for example.

In particular, if electromagnetic coils 2080 are disposed in upper portion 2025 then magnets 2085 may be disposed in lower portion 2026. On the other hand, if magnets 2080 are disposed in upper portion 2025 then electromagnetic coils 2085 may be disposed in lower portion 2026. In an example application, an electromagnetic attraction or repulsion between corresponding coils and magnets may impart a torque on lens holders 2030 or 2040. Such a torque may tilt or rotate lens holders 2030 or 2040, as indicated by arrow 2105, for example. Of course, such tilt or rotation may be about any number of directions, and arrow 2105 is merely one example of a tilt or rotation. Torque imparted by a coil/magnet pair may be based, at least in part, on an amount of electrical current flowing in the coil, for example. FIG. 20 shows four coil/magnet pairs for the individual lens assemblies. However, a moveable platform may comprise any number of coil/magnet pairs. In an implementation, such a tilt/rotation actuator may operate independently of actuators discussed above that move a moveable platform horizontally or vertically, for example.

FIGS. 22-23 are perspective views showing some details of a tilt or rotation actuator of a compact imaging module 2200, according to an embodiment. Compact imaging module 2200 may be similar to compact imaging module 2000 except for the following differences: Compact imaging module 2000 included coils disposed in an upper portion of a moveable platform and magnets disposed in a lower portion of the moveable platform (or vise versa), On the other hand, compact imaging module 2200 may include coils 2280 disposed in an upper portion 2225 of a moveable platform and magnets 2285 disposed in an outer casing or yoke 2210 (or vise versa). Accordingly, a lower portion 2226 of the moveable platform need not include any coils or magnets.

As in the case for compact imaging module 2000, upper portion 2225 may comprise a first lens holder 2230 to receive a first lens unit, a second lens holder 2240 to receive a second lens unit, and springs 2260, which may comprise leaf springs, for example. In one implementation, one such spring may be attached between a first lens unit and a portion of upper portion 2225, and another such spring may be attached between a second lens unit and a portion of upper portion 2225, Springs 2260 may provide a restoring force to the lens units as the lens units are rotated and/or tilted from their neutral positions (e.g., which may be in-line with an optical axis of an image sensor). Such rotation and/or tilting may be implemented by coils/magnets 2280 disposed in upper portion 2225 interacting with magnets/coils 2285 disposed in outer casing or yoke 2210, for example. In particular, if electromagnetic coils 2280 are disposed in upper portion 2225 then magnets 2285 may be disposed in outer casing or yoke 2210. On the other hand, if magnets 2280 are disposed in upper portion 2225 then electromagnetic coils 2285 may be disposed in outer casing or yoke 2210. As explained above, an electromagnetic attraction or repulsion between corresponding coils and magnets may impart a torque on lens holders 2230 or 2240, Such a torque may tilt or rotate lens holders 2230 or 2240. Torque imparted by a coil/magnet pair may be based, at least in part, on an amount of electrical current flowing in the coil, for example. FIG. 23 shows four coil/magnet pairs for the individual lens assemblies. However, a moveable platform may comprise any number of coil/magnet pairs. In an implementation, such a tilt/rotation actuator may operate independently of actuators discussed above that move a moveable platform horizontally or vertically, for example.

FIG. 24 is a top view of an aperture for a compact imaging module, according to another embodiment. Outer casing or yoke 2210 may be used to at least partially enclose a moveable platform and/or an actuator portion, such as 1502 shown in FIG. 15, for example. Outer casing or yoke 2210 may include an aperture 2250 to allow light to reach a selected lens assembly, for example.

FIGS. 25 and 26 are perspective views showing some details of a tilt or rotation actuator of a compact imaging module 2500, according to another embodiment. Compact imaging module 2500 may be similar to compact imaging module 2000 except for the following differences: Compact imaging module 2000 included coils disposed in an upper portion of a moveable platform and magnets disposed in a lower portion of the moveable platform (or vise versa), On the other hand, compact imaging module 2500 may include coils 2285 disposed in an upper portion 2525 of a moveable platform and magnets 2580 disposed on a lens holder. Accordingly, a lower portion 2526 of the moveable platform need not include any coils or magnets.

As in the case for compact imaging module 2500, upper portion 2525 may comprise a first lens holder 2570 to support a first lens unit, a second lens holder 2575 to support a second lens unit, and springs 2560, which may comprise leaf springs, for example. First lens holder 2570 may comprise an aperture 2530 to receive a first lens unit, and second lens holder 2575 may comprise an aperture 2540 to receive a second lens unit. Lower portion 2526 may comprise a cavity 2529 to receive the first lens unit, and a cavity 2539 to receive the second lens unit.

In one implementation, one portion of spring 2560 may be attached between first lens holder 2570 and upper portion 2525, and another portion of spring 2560 may be attached between second lens holder 2575 and upper portion 2525. Spring 2560 may provide a restoring force to the lens holders as the lens holders are rotated and/or tilted from their neutral positions (e.g., which may be in-line with an optical axis of an image sensor). Such rotation and/or tilting may be implemented by colls/magnets 2585 disposed in upper portion 2525 interacting with magnets/coils 2580 disposed on lens holders 2570 and 2575, for example. In particular, if electromagnetic coils 2585 are disposed in upper portion 2525 then magnets 2580 may be disposed on the lens holders, On the other hand, if magnets 2585 are disposed in upper portion 2525 then electromagnetic coils 2580 may be disposed on the lens holders. As explained above, an electromagnetic attraction or repulsion between corresponding coils and magnets may impart a torque on lens holders 2570 or 2575. Such a torque may tilt or rotate the lens holders. Torque imparted by a coil/magnet pair may be based, at least in part, on an amount of electrical current flowing in the coil, for example. FIG. 26 shows four coil/magnet pairs for the individual lens assemblies. However, a moveable platform or lens holders may comprise any number of coil/magnet pairs. In an implementation, such a tilt/rotation actuator may operate independently of actuators discussed above that move a moveable platform horizontally or vertically, for example. Of course, such details of compact imaging module 2500 are merely examples, and claimed subject matter is not so limited.

One skilled in the art will realize that a virtually unlimited number of variations to the above descriptions is possible, and that the examples and the accompanying figures are merely to illustrate one or more particular implementations.

The terms, "and," "and/or," and "or" as used herein may include a variety of meanings that also is expected to depend at least in part upon the context in which such terms are used. Typically, "or" as well as "and/or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe some combination of features, structures, or characteristics. Though, it should be noted that this is merely an illustrative example and claimed subject matter is not limited to this example.

While there has been illustrated and described what are presently considered to be example embodiments, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular embodiments disclosed, but that such claimed subject matter may also include all embodiments falling within the scope of the appended claims, and equivalents thereof.

What is claimed is:

1. An apparatus comprising:
a first lens assembly having a first effective focal length and a second lens assembly having a second effective focal length;
a moveable platform on which said first and said second lens assemblies are mounted, said moveable platform being moveable between first and second positions;
an image sensor positioned to receive light from said first lens assembly if said moveable platform is in said first position or to receive light from said second lens assembly if said moveable platform is in said second position; and
a single mechanical power source to move said moveable platform to said first position or said second position and to change a distance between said image sensor and said moveable platform to adjust a focus of said first lens assembly or said second lens assembly with respect to said image sensor.

2. The apparatus of claim 1, wherein said single mechanical power source comprises an actuator to move a sliding or rolling element along a range of positions in a first direction, wherein at particular portions of said range said sliding element applies a force to said moveable platform in a second direction different from said first direction.

3. The apparatus of claim 1, wherein said single mechanical power source comprises an actuator to move a sliding element along a range of positions in a first direction so as to move said moveable platform between said first and second positions, wherein at particular portions of said range said sliding element applies a force to said moveable platform so as to change said distance between said image sensor and said moveable platform.

4. The apparatus of claim 2, wherein said moveable platform is moveable in said first direction or said second direction in response to a mechanical force transferred from said sliding element to said moveable platform.

5. The apparatus of claim 4, wherein said moveable platform comprises an angular contact edge to transfer said mechanical force from said sliding element to said moveable platform, wherein said angular contact edge is inclined and/or curved with respect to a top surface of said moveable platform.

6. The apparatus of claim 2, wherein said sliding element comprises a circular roller.

7. The apparatus of claim 1, further comprising one or more electromagnetic actuators disposed in said moveable platform to tilt or rotate said first or second lens assemblies with respect to an optical axis of said image sensor.

8. The apparatus of claim 7, further comprising springs to provide a restoring force for said tilting or rotating of said first or second lens assemblies.

9. The apparatus of claim 2, wherein movement along said first direction of said moveable platform is linear.

10. The apparatus of claim 1, further comprising a pre-load spring to provide a compressive force to compress an upper portion of said moveable platform with respect to a lower portion of said moveable platform.

11. The apparatus of claim 1, further comprising one or more sensors to detect a position of said moveable platform.

12. An apparatus comprising:
a lens platform comprising an upper portion and a lower portion, wherein said upper portion supports a first lens assembly having a first effective focal length and a second lens assembly having a second effective focal length;
a drive mechanism to move said lens platform in a first direction, wherein an image sensor is positioned to receive light from said first lens assembly if said lens platform is in a first position or to receive light from said second lens assembly if said lens platform is in a second position; and
an inclined and/or curved surface to interact with said drive mechanism to convert motion in said first direction to motion in a second direction to change a distance between said image sensor and said upper portion.

13. The apparatus of claim 12, wherein said inclined and/or curved surface comprises a portion of said upper portion of said lens platform.

14. The apparatus of claim 12, wherein said inclined and/or curved surface comprises a portion of said drive mechanism and wherein said upper portion of said lens platform comprises a slide or roller.

15. The apparatus of claim 12, further comprising physical barriers to establish a range of motion of said lens platform in said first direction, and wherein said drive mechanism drives said upper portion in said second direction if said drive mechanism attempts to drive said lens platform beyond said range of motion.

16. The apparatus of claim 12, wherein said second direction is substantially perpendicular to said first direction.

17. The apparatus of claim 12, wherein a focus of said first lens assembly or said second lens assembly is adjustable with respect to said image sensor in response to a change in distance between said image sensor and said upper portion.

18. The apparatus of claim 12, further comprising a sliding structure to move said upper portion in said second direction while said sliding structure moves in said first direction.

19. The apparatus of claim 18, further comprising an actuator and screw drive to drive said sliding structure in said first direction.

20. The apparatus of claim 12, wherein said first direction comprises a direction perpendicular to an optical axis of said first or said second lens assemblies, and wherein said second direction comprises a direction parallel to said optical axis.

21. The apparatus of claim 12, further comprising one or more electromagnetic actuators disposed in said lens platform to tilt or rotate said first or second lens assemblies with respect to an optical axis of said image sensor.

22. The apparatus of claim 21, further comprising springs to provide a restoring force for said tilting or rotating of said first or second lens assemblies.

23. An apparatus comprising:
a lens platform comprising an upper portion and a lower portion, wherein said upper portion supports a first lens assembly having a first effective focal length and a second lens assembly having a second effective focal length; and
a single drive mechanism to move said lens platform to a first position or a second position in a first direction and to move said upper portion with respect to said lower portion in a second direction, wherein an image sensor is positioned to receive light from said first lens assembly if said lens platform is in said first position or to receive light from said second lens assembly if said lens platform is in said second position.

24. The apparatus of claim 23, wherein said single drive mechanism comprises an electromagnetic actuator.

25. The apparatus of claim 23, wherein said single drive mechanism comprises a piezoelectric actuator.

* * * * *